United States Patent [19]

Message

[11] Patent Number: 4,880,093
[45] Date of Patent: Nov. 14, 1989

[54] FREE-WHEEL DEVICE HAVING CLAMPING CAMS

[75] Inventor: Olivier Message, Bourg-la-Reine, France

[73] Assignee: SKF France, Clamart, France

[21] Appl. No.: 146,862

[22] Filed: Jan. 22, 1988

[30] Foreign Application Priority Data

Jan. 29, 1987 [FR] France .................................. 87 01092

[51] Int. Cl.$^4$ ............................................. F16D 41/07
[52] U.S. Cl. .................................. 192/45.1; 192/41 A
[58] Field of Search ........................... 192/41 A, 45.1; 188/82.8

[56] References Cited

U.S. PATENT DOCUMENTS

| | | | |
|---|---|---|---|
| 2,744,598 | 5/1956 | Troendly .............................. | 192/45.1 |
| 2,824,635 | 2/1958 | Troendly et al. .................. | 192/45.1 |
| 2,973,072 | 2/1961 | Ferris .................................. | 192/45.1 |
| 3,219,163 | 11/1965 | Zlotek .................................. | 192/45.1 |

FOREIGN PATENT DOCUMENTS 2093188  1/1972  France .

*Primary Examiner*—Leslie A. Braun
*Assistant Examiner*—Richard M. Lorence

[57] ABSTRACT

Free-wheel device having clamping cams, intended to be mounted between an external cylindrical sliding path (5) and an internal cylindrical sliding path (4) comprising a cage (3) of generally cylindrical shape provided with a plurality of apertures (8) for the passage of at least part of each cam (2) and a strap spring (1) of generally cylindrical shape provided with a plurality of windows (9) within which the cams are mounted, each cam bearing against a rim of the corresponding window defining a pivoting edge (10) for the cam and subjected to the action of a pivoting tongue (11) fixed to the spring, tending to cause the cam to pivot in the direction favouring clamping while exerting a thrust on the cam towards the pivoting ridge (10), characterized in that the position and the shape of the zone of contact between the cam and the pivoting tongue are selected in a manner such that the lever arm (l) of the variable force (F) exerted by the tongue relative to the pivoting edge (10) varies in inverse proportion to the value of the force when the misalignment of the device varies so that the restoring torque remains constant whatever may be the interval between the internal (4) and external (5) sliding paths.

24 Claims, 4 Drawing Sheets

FREE-WHEEL DEVICE HAVING CLAMPING CAMS

The present invention invention relates to a free-wheel device possessing clamping cams, which device is intended to be mounted between two internal and external slideways, and possesses a plurality of clamping cams, a cage and a strap spring which exerts on the cams a restoring torque in the direction favouring clamping.

Free-wheels of this type are already known which are accommodated between an internal slideway, for example a shaft, and an external slideway or seating. Examples which may be mentioned are U.S. Pat. Nos. 2,744,598 and 2,824,635. In these documents, the cams are gripped between one rim of the window in the spring and a pivoting tongue whose end comes into contact with a concave portion of the clamping cam. The edge of the tongue abuts in contact with slightly concave or virtually plane portions of the surface of the cam, which entails substantial frictional forces and premature wear of the surfaces in contact. These known free-wheel devices further present operating difficulties in the event of misalignment between the seating and the shaft of the free-wheel device. When the size of the interval or air gap between the interior and exterior slideways is increased, inclination of the cams increases in the free-wheel position, that is to say immediately before the clamping and the commencement of the torque engagement. The angle of flexion of the pivoting tongue is thereby diminished, in a manner such that the force exerted by the tongue likewise diminishes. At the same time, the lever arm of this force relative to the pivoting point of the cam which corresponds to the edge of the window of the spring opposite the tongue likewise diminishes in proportion to the swinging of the cam. The result is a reduction in the restoring torque exerted on the cam by the pivoting tongue.

Conversely, if the size of the interval between the interior and exterior slideways is reduced, an increase takes place in the flexion of the tongues, entailing an increase in the effort exerted on the cams and, at the same time, an increase in the lever arm relative to the pivoting point, the result of which is an increase in the restoring torque.

Such variations in the restoring torque during the functioning of the free-wheel device in the event of misalignment thus entail a variation in the restoring torque exerted by the spring on the cams, according to whether the cams are in the maximum air gap or minimum air gap zone. As a result, difficulties arise in synchronizing the cams when the torque engages. The cams undergoing the weakest restoring torques thus tend to be slower to engage torque or even not to participate in the clamping.

The same disadvantage, caused by the variation in the restoring torque in the event of misalignment, is likewise found in the free-wheel devices described in French Patents Nos. 2,342,429 and 2,583,843. The design of these free-wheel devices, in fact, is such that despite the use of rocking tongues which are improved relative to the known embodiments mentioned above, the restoring torque exerted by these tongues on the cams in the event of misalignment is again found to vary. As before, operating difficulties result, in particular the occurrence of problems in synchronizing all the cams due to the dispersion of the restoring torques exerted on the cams.

The object of the present invention is therefore to provide a free-wheel device having clamping cams, of the type mentioned above, wherein the structure of the cams and of the clamping tongues is such that the restoring torque exerted on the cams is maintained at a substantially constant value whatever the misalignment between the internal slideway and the external slideway, thus notably improving the synchronization of all the clamping cams in the free-wheel device.

To this end, the free-wheel device having clamping cams according to the invention, which is intended to be mounted between an external cylindrical slideway and an internal cylindrical slideway, comprises a cage of generally cylindrical shape provided with a plurality of apertures for the passage of at least part of each cam, and a strap spring of generally cylindrical shape provided with a plurality of windows within which the cams are mounted. Each cam bears against a rim of the corresponding window of the spring defining a pivoting edge for the cam, and is subjected to the action of a pivoting tongue fixed to the spring, tending to cause the cam to pivot in the direction favouring clamping while exerting a thrust on the cam towards the pivoting edge. The position and the shape of the contact zone between the cam and the pivoting tongue are selected in a manner such that the lever arm of the variable force exerted by the pivoting tongue relative to the pivoting edge varies in inverse proportion with the value of the said force when the misalignment between the external slideway and the internal slideway varies.

The zone of contact between the cam and the pivoting tongue is preferably such that the reaction of the force exerted by the tongue on the cam makes, with the straight line joining the point of articulation of the tongue on the spring and the point of contact of the tongue on the cam, an angle which remains substantially constant during the operation of the free-wheel device whatever the inclination of the cam in free-wheel operation, due to the misalignment of the device.

In a preferred embodiment of the invention, the zone of contact between the clamping cam and the pivoting tongue is a convex boss on which the tongue comes to bear. The preferred shape of this convex boss is a cylindrical boss having an axis substantially parallel to that of the free-wheel device.

The portion of the tongue which comes to bear on the boss of the clamping cam is preferably substantially plane. It may likewise possess a convex profile whose convexity is directed towards the cam.

In a preferred embodiment of the invention, the support boss of the pivoting tongue is defined by a lateral excrescence of the cam delimited by a hollow portion of the lateral wall of the cam, within which the end of the pivoting tongue can partially penetrate.

In a particular embodiment, the pivoting tongue is located on one side of the generally cylindrical surface formed by the strap spring when the free-wheel device is positioned between the external slideway and the internal slideway. The structure of the tongue and of the zone of contact between the tongue and the cam are preferably such that the pivoting tongue remains on this same side during the operation of the free-wheel device, whatever may be the inclination of the cam in the free-wheel position due to the misalignment of the device.

In another embodiment, the tongue may possess portions located on one side of the said cylindrical surface and portions located on the other side. A tongue of this kind may, for example, possess one or more undulations situated between the articulation zone and the zone of contact with the cam.

The boss on which the pivoting tongue comes to bear may be generally directed towards the interior, in which case the pivoting tongue exerts a thrust directed towards the exterior. In another embodiment the boss may be generally directed towards the exterior, in which case the pivoting tongue exerts a force directed towards the interior. "Interior" is used to describe any element section or any element which is situated nearer to the axis of symmetry of the free-wheel device during operation than another section or another element which is then described as "exterior".

The invention will be better understood with reference to two particular embodiments, which are described by way of example and without limiting effect, and are illustrated by the attached drawings, in which.

Figure 1:
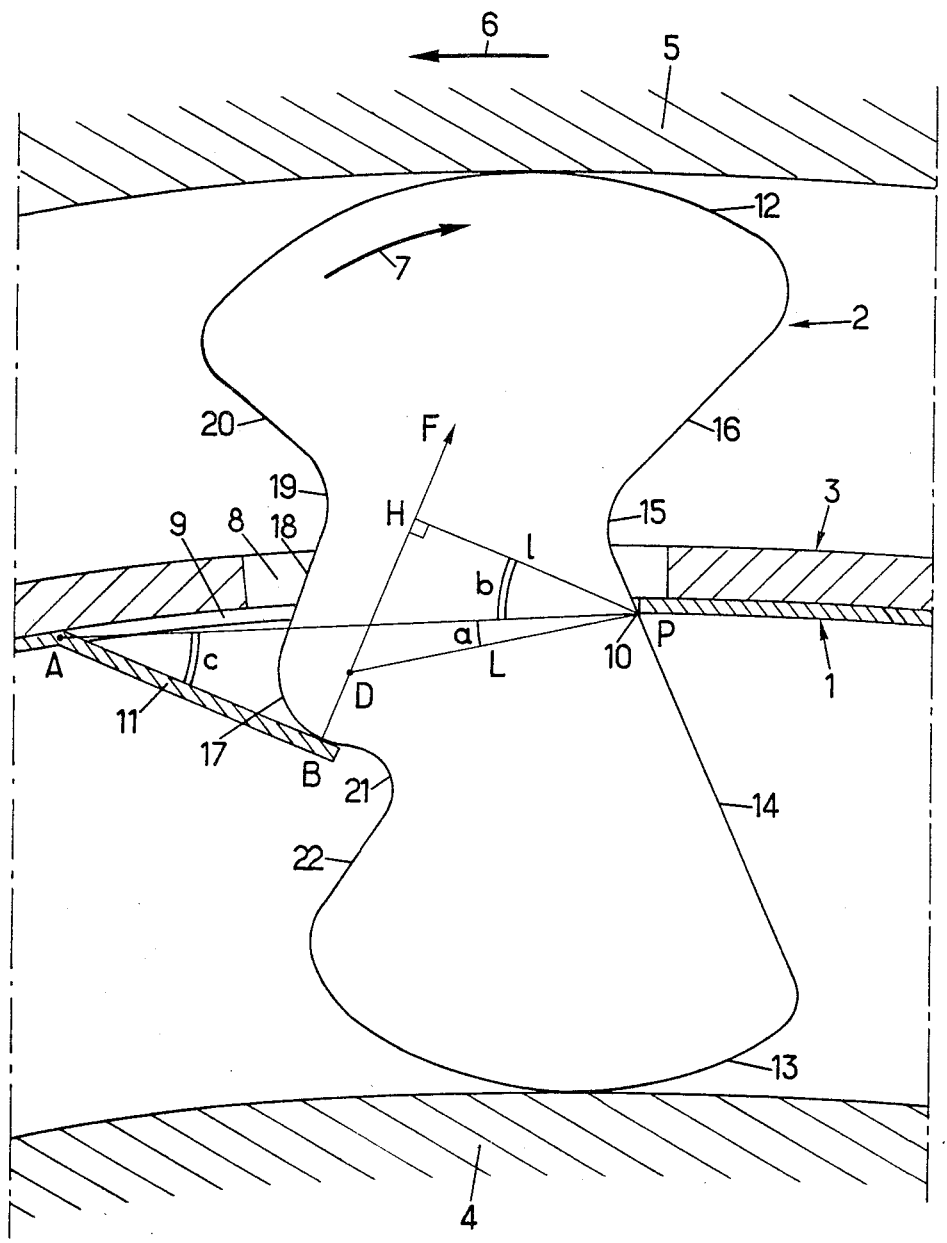
FIG. 1 is a partial disagrammatic sectional view of a free-wheel device according to the invention, showing one of the clamping cams positioned between two slideways, internal and external, which are perfectly concentric and without misalignment, the figure showing the position of the clamping cam before the engagement of torque, that is to say in free-wheel operation.
Figure 2:
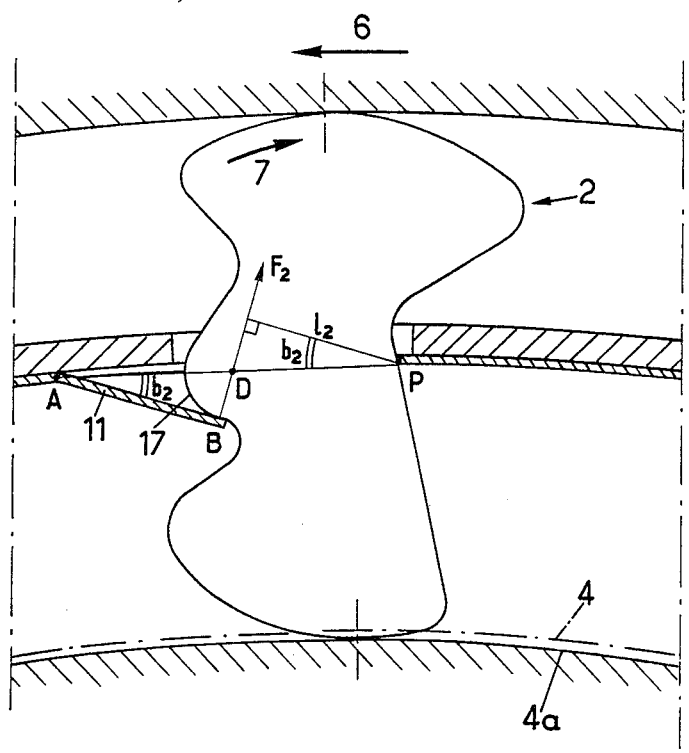
FIG. 2 is a view similar to FIG. 1, illustrating the case of operation with misalignment, causing a larger air gap between the two sliding tracks. The figure likewise shows the clamping cam before engagement of torque, that is to say in free-wheel operation.
Figure 3:
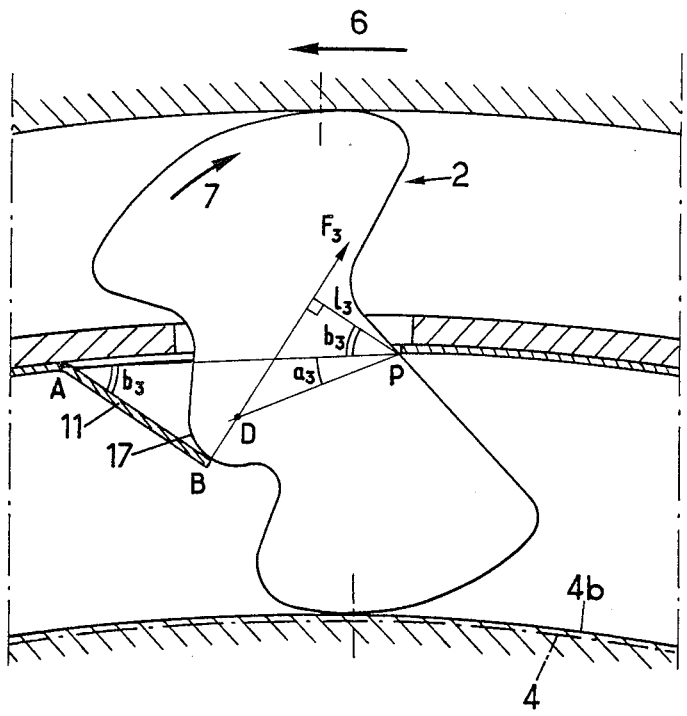
Figure 4:
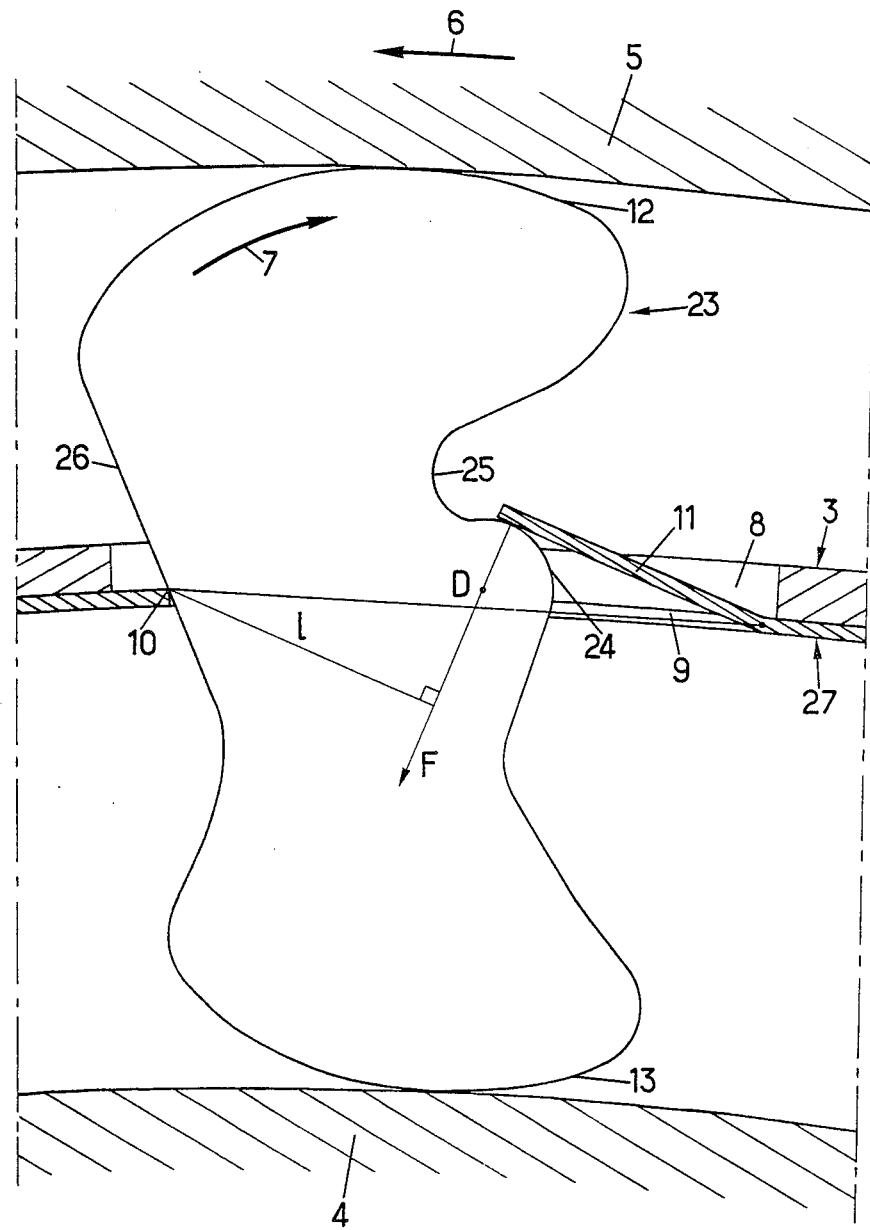

FIG. 3 is a view similar to FIG. 2, showing a device with misalignment resulting in an air gap less than that in FIG. 1. The figure shows the position of the clamping cam before engagement of torque, that is to say in free-wheel operation; and FIG. 4 is a view similar to FIG. 1 of an alternative embodiment of a free-wheel device according to the invention, the clamping cam being shown after installation between two slideways, without misalignment, the figure illustrating the position of the clamping cam before engagement of torque, that is to say in free-wheel operation.

Figure 5:
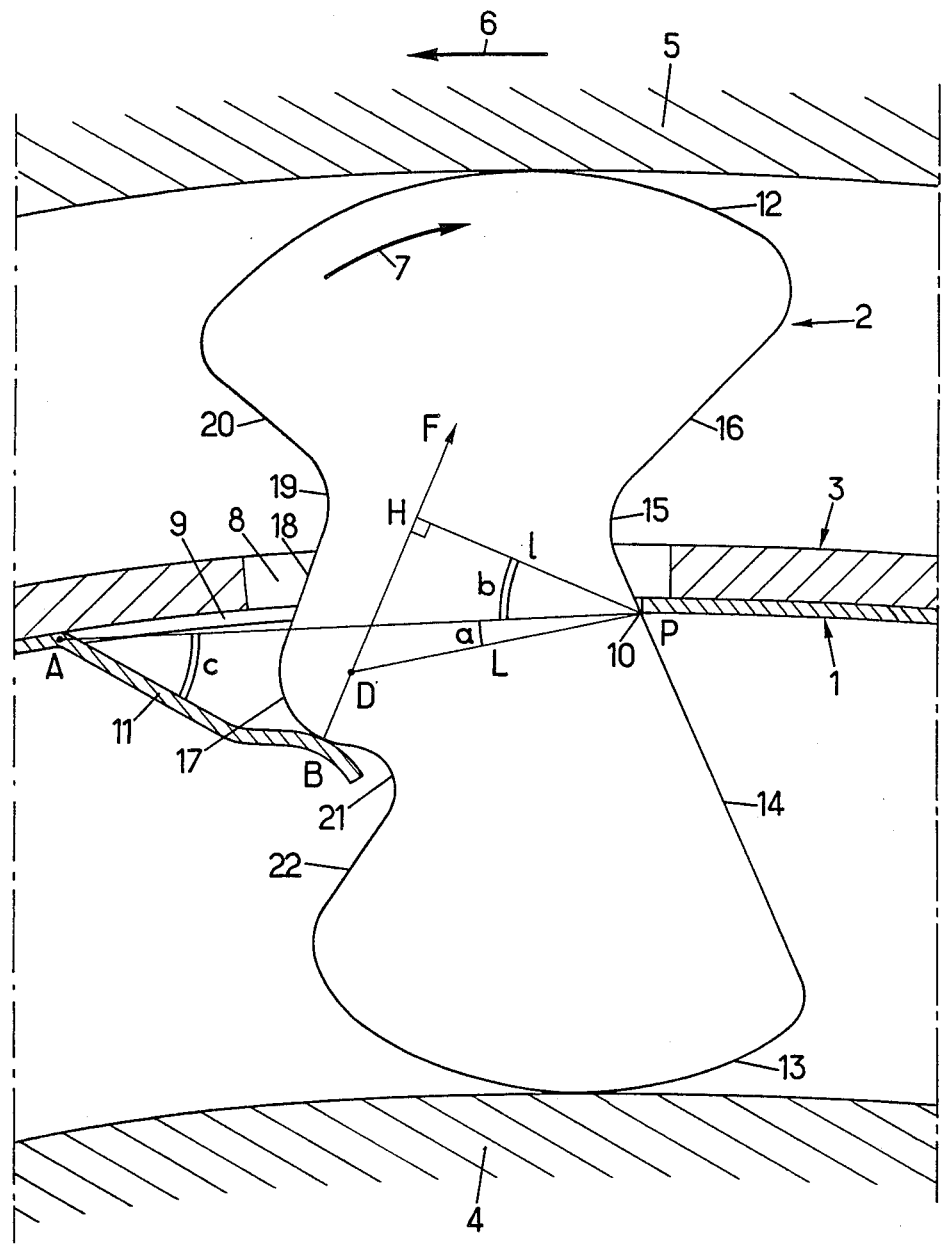

FIG. 5 is a view similar to FIG. 1, showing an alternative embodiment in which the cam is contacted by a convex surface of the tongue of the spring.

As is shown in FIG. 1, the free-wheel device having clamping cams comprises a strap spring 1, of substantially cylindrical general shape, a plurality of clamping cams 2 whereof only one is visible in the figure, and a cylindrical cage 3. The assembly comprising the spring 1, the clamping cams 2 and the cage 3 is introduced, on installation, between an internal slideway or shaft 4 and an exterior slideway or seating 5. The two slideways 4 and 5 are normally concentric, their difference in diameter defining an air gap within which the various clamping cams 2 are seated.

In order to establish the concepts and to clarify the description, it will be considered by way of example that the shaft 4 defining the interior slideway is fixed whereas the seating constituting the external slideway 5 is entrained to rotate in the direction of the arrow 6. This free-wheel movement is permitted by the various clamping cams 2 which are in sliding contact with the two slideways 4 and 5. A rotational movement in the direction opposite the arrow 6 is, conversely, prevented by virtue of the particular shape of the clamping cams 2 which then swing in the direction of the arrow 7 entailing clamping and immobilization of the two slideways 4 and 5 relative to one another. The shaft 4, for example, can then be driven to rotate at the same speed as the seating 5 via the free-wheel device.

The cage 3 possesses a plurality of apertures 8 permitting the passage and introduction of the cams 2, for example from the exterior towards the interior.

The spring 1 in strap shape comes to bear in the bore of the cage 3 and possesses a plurality of windows 9 which are partially opposite apertures 8 in the cage 3. The cams 2 are mounted within the windows 9, each cam 2 coming to bear from the rear on a pivoting edge 10 formed by the rear rim of the window 9. On the front side, the same window 9 possesses a pivoting tongue 11 which is slightly folded back towards the interior and, as a result of the elasticity of the material of which the spring 1 is formed, exerts a restoring force on the cam 2 at the point of contact B between the cam 2 and the tongue 11. In the example illustrated, the tongue 11 is plane. It would also be possible to consider the use of a tongue of different shape, and in particular one which possesses one or more undulations to improve its flexibility. The arguments which follow would remain the same if, in each case, the fictitious straight line joining points A and B in FIG. 1 were to be used in place of the plane tongue. The restoring force which is represented by force F in the figure depends on the flexion of the tongue 11. The more the flexion of the tongue 11 increases, the greater the force F. If, in order to simplify the drawings and the argument, it is conceded, as is approximately accurate, that the tongue 11 maintains its initial shape and flexes about a line of articulation whose track is designated A in FIG. 1, whereas the pivoting edge formed by the opposite rim of the window 9 is designated P in FIG. 1, the result is that the value of the restoring force F is proportional to the angle c formed by the tongue 11 or the straight line AB relative to the straight line AP.

Each clamping cam 2, of identical structure, possesses an exterior sliding surface 12 and an interior sliding surface 13. These surfaces can be produced in the form of cylindrical surfaces or of an association of a plurality of cylindrical surfaces whose centres of curvature are offset relative to one another, in a manner such as to entail an increase in dimensions, particularly of the clamping cam 2 during its rocking, in a manner such as to permit, as is conventional, the clamping operation. The clamping cam of the free-wheel device according to the invention possesses a substantially plane rearface 14 which comes into contact with the pivoting edge 10, whose track is represented by the point P in FIG. 1. Of course, the face 14 could also have a different profile without consequently affecting the operation. The plane face 14 which, in the interior zone, joins up with the interior sliding surface 13 also joins up, via a concave rounded zone 15, with a plane surface section 16 which itself is continued by the exterior sliding surface 12.

On the front side, the cam 2 possesses a lateral escrescence which is generally directed towards the interior and designated 17 as a whole. This excrescence constitutes a convex boss which, in the example shown in FIG. 1, possesses a cylindrical surface whose center of curvature is referenced by the letter D. The cylindrical surface of the boss 17 connects, towards the exterior, with a plane surface portion 18 which is continued, after a concave one 19, by a plane surface portion 20 which is itself connected to the exterior sliding surface 12. As may be seen in FIG. 1, the exterior portion of the cam 2 consequently possesses an opened-out zone defined towards the exterior by the exterior sliding surface 12 and tapering towards the two concave zones 15 and 19.

Towards the interior, on the other hand, the convex box 17 connects with a concave portion 21 within which the end of the tongue 11 can partially penetrate during the rocking of the cam 2. The concave portion 21 then connects, towards the interior, with a plane surface portion 22 which is continued by the interior sliding surface 13.

As may be seen in FIG. 1, the restoring force F exerted by the tongue 11 which comes into contact with the cylindrical surface of the convex boss 17 is perpendicular to the tangent common to the two surfaces in contact. This restoring force, which is exerted at the point of contact B, thus passes through the centre of curvature D and forms a substantially constant angle with the straight line AB. In the example shown, the tongue 11 being of generally plane shape, the result is that the restoring force is likewise perpendicular to the tongue 11. The tongue 11 being tangential to the surface of the boss 17, the friction between the tongue 11 and the cam 2 is reduced to the maximum extent, and the greater part of the restoring force produced by the elastic tongue 11 is obtained, which would not be the case if the tongue were acting on the cam by means of an end edge in contact with a plane surface of the cam, as is the case in most of the freewheel devices having cams of a known type.

It will be noted, moreover, that the restoring force F, while generally being directed towards the exterior, is inclined relative to the radial direction, in a manner such that it possesses a component which is directed towards the rear, namely towards the clamping edge 10 or the point P. Under these conditions, the pivoting tongue 11 does indeed tend to exert a thrust on the cam 2 towards the pivoting edge 10, which is necessary for the operation of the device.

The restoring torque C exerted by the pivoting tongue 11 on the cam 2 is given by the formula:

$$C = F \times L$$

where F is the restoring torque exerted by the tongue 11 and l is the leverage, that is to say the length of the perpendicular dropped from the point P to the point H on the vector F of FIG. 1.

According to the present invention, the lever arm l varies in inverse proportion to the value of the restoring force F when the inclination of the cam 2 is modified by virtue of a misalignment between the internal 4 and external 5 sliding parts.

FIG. 2, in whch identical members possess the same references, illustrates a possible position of a clamping cam 2 before engagement of torque in operation with misalignment in a direction where the air gap is greater than that in FIG. 1. The interior slideway, whose track is referenced 4a in FIG. 2, is thus situated further inwards than the slideway 4 shown in dot-and-dash lines. Taking account of this increased air gap, the clamping cam 2 has swung in the direction of the arrow 7 relative to the position which it occupied in FIG. 1. The pivoting tongue 11, which has remained in contact with the cylindrical surface of the external boss 17, is less flexed than in the case of FIG. 1. The restoring force designated $F_2$ is therefore less. On the other hand, as is seen in FIG. 2, the length $L_2$ of the lever arm is greater.

In the converse case illustrated in FIG. 3, where the air gap is reduced, the track of the interior slideway 4b is situated further outwards than that of the slideway 4. Clamping cams 2 are situated in an angular position swung in the direction opposite to the arrow 7. The pivoting tongue 11 is more flexed than in the preceding cases, in a manner such that the restoring force $F_3$ is greater. On the other hand, it is seen in FIG. 3 that the length of the lever arm $L_3$ is further reduced.

In these conditions, by virtue of the particular configuration of the cam 2 provided with its convex boss 17 in contact with the pivoting tongue 11, a substantially constant restoring torque is obtained by causing the length of the lever arm l and the value of the restoring force F to vary in inverse proportion.

It will be understood that the swinging of the cam 2 must be kept within reasonable limits to obtain such a result. The optimum zone of operation may readily be defined by certain geometrical considerations illustrated in FIG. 1. If D designates the centre of curvature of the cylindrical surface of the convex boss 17, it is possible to define the angle a between the segments PA and PD. Moreover, if B designates the point of contact between the tongue 11 and the surface of the convex boss 17, it will be conceded that the angle a is positive if the segment PD is situated towards the interior relative to the segment PA, as is the case in FIG. 1. On the other hand, the angle a will be seen to be negative when the segment PD is situated towards the exterior relative to the segment PA. It will be noted that, in FIG. 2, the angle a is zero since the point D forms part of the segment PA. Moreover, b will designate the angle formed by the segments PA and PH (FIG. 1). In the example shown, the angles b and c are equal since the tongue 11 is perpendicular to the restoring force F. In a more general case, the angles b and c have different values while still varying in the same direction.

If, moreover, L is noted as being the length of the segment PD, it is seen that it is possible to write:

$$l = L \cos(a+b)$$

The lever arm l is therefore zero when the sum of the angles (a + b) is equal to 90°. This is the lower limit of the level arm l. In effect, if (a+b) were greater than 90°, the direction of the restoring torque on the cam would be inverted. The upper limit of the lever arm l is the value L in the case where the sum of the angles (a+b) equals zero, that is to say that b = −a.

Within these two limits, it is appropriate for the lever l to vary in inverse proportion to the restoring force F, that is to say in inverse proportion to the angle c or to the angle b since b and c vary in the same direction.

The formula for the variation of the lever arm l relative to the angle b is:

$$\frac{dl}{db} = -L \sin(a+b)\left(1 + \frac{da}{db}\right)$$

Since the angles a and b vary in the same direction within the range considered, it is apparent that da/db is always positive.

In order for dl/db to be always negative, it is thus sufficient for sin (a+b) to always remain positive, a condition which is obtained when:

$$180° > (a+b) > 0$$

Bearing in mind the operational limitation imposing (a+b)<90°, the final useful range for which a lever arm 1 is obtained which varies in inverse proportion to the restoring force F is obtained when:

$$90° > (a+b) > 0$$

In practice, of course, only part of the possible range will be used, as is shown for example in FIGS. 2 and 3. A swing greater than that shown in FIG. 2, still in the direction of the arrow 7, would also be perfectly possible and would enable a negative value of the angle a to be obtained with an even lower restoring force, together with a corresponding increase in the value of the lever arm 1.

In practice, in order to provide a safety margin, use will preferably only be made, for normal free-wheel operation of the cam, of the range within which the centre of curvature D of the zone of the boss in contact with the tongue is always on the same side of the generally cylindrical surface formed by the strap spring.

In the alternative embodiment shown in FIG. 4, where the identical members bear the same reference numbers, the cams 23 possess a different structure to the extent that the convex boss 24 corresponding to the boss 17 in the previous embodiment is generally directed towards the exterior and positioned on the rearface of the cam 23. As before, the boss 24 possesses a substantially cylindrical surface which is defined by a hollow portion 25 positioned towards the exterior, to the interior of which the end of the tongue 11 can partially penetrate. The frontface of the cam 23 is substantially plane and is referenced 26. It comes into contact via the edge 10 with the rim of the window 9 of the spring 27.

The pivoting tongue 11 is flexed towards the exterior in order to be able to bear on the convex hub 24. For this purpose, the tongue 11 will partially penetrate within the aperture 8 of the cage 3.

As before, FIG. 4 shows the restoring force F perpendicular to the surface of the convex boss 24 and to the tongue 11 of substantially plane general shape. As before, the force F passes through the centre of curvature D of the boss 24. In this embodiment, the restoring force F is generally directed towards the interior, while possessing a component which is directed towards the pivoting edge 10. The lever arm is referenced 1. If the cam 23 swings in the direction of the arrow 7, by virtue of an increase in the interval between the sliding paths 4 and 5, the restoring force F diminishes whereas the lever arm 1 increases. If the cam swings in the other direction, because of a reduction of the interval between the slideways 4 and 5, the restoring force F increases while the lever arm 1 diminishes. In all cases, and as before, the restoring torque is thus maintained substantially constant.

It will be noted that the pivoting tongue, instead of being substantially plane as in the embodiments shown, could possess a substantially convex portion, of a convexity pointing towards the boss, in the vicinity of its zone of contact with the boss 17, 24 of the cam Such a tongue is shown in FIG. 5.

In the present description, "front" refers to elements or members of the cams or of the spring which are on the front side relative to the assumed movement of the seating 5 in the direction of the arrow 6. In the figures shown, the "front" side is therefore on the left of the drawings whereas the rear side is on the right of the drawings.

I claim:

1. In a free-wheel drive, an external cylindrical slideway and an internal cylindrical slideway mounted substantially concentric one to another for relative rotation and defining therebetween a substantially cylindrical gap;

a series of tiltable clamping cam elements disposed between said slideways within said cylindrical gap, said cam elements being tiltable in one direction into clamping engagement with both of said slideways and tiltable in an opposite direction to tend to disengage said cam elements from said slideways, each cam element comprising an external sliding surface and an internal sliding surface capable of coming into sliding or clamping contact with said respective external and internal cylindrical slideways depending upon the inclination of the corresponding cam element, each cam element further comprising a rearface and a front face, said front face having means defining a convex contact zone;

means defining a generally cylindrical cage member mounted between said slideways and provided with a plurality of apertures for passage of at least of part of said cam elements received therein;

a strap spring means of generally cylindrical shape mounted between said slideways and having a plurality of windows adapted for mounting therein said cam elements, one edge portion of each said windows engaging said rearface of the cam element mounted in the corresponding window for defining a pivoting edge for said cam element, said strap spring means being formed with a plurality of pivoting tongues respectively extending from a line of articulation into each of said windows for exerting a force against said convex contact zone of said respective cam elements in such a way that the cam elements are caused to pivot into clamping engagement with the slideways and are pushed towards the pivoting edge of the corresponding window;

the position and shape of said convex contact zone being such that a lever arm of said force relative to said pivoting edges varies in inverse proportion to the value of said force when the inclination of the cam element varies due to variations of said cylindrical gap.

2. A free-wheel device according to claim 1 wherein, at different inclinations of a cam due to misalignment during free-wheel operation, there is a substantially constant angle between (a) a line for force exerted by the cam on the tongue, and (b) a straight line which extends from said line of articulation to a point where the tongue contacts the cam.

3. A free-wheel device according to claim 2 wherein the tongue is substantially plane, and said constant angle is about 90°.

4. A free-wheel device according to claim 1 wherein each tongue has a convex surface which contacts its respective cam.

5. A free-wheel device according to claim 1 wherein the convex contact zone is defined by a lateral excrescence of the cam, said cam having a lateral wall with a hollow portion which is partially penetrated by the tongue.

6. A free-wheel device according to claim 1 wherein the convex contact zone has a cylindrical surface portion.

7. A free-wheel device according to claim 1 wherein, at all inclinations of the cams, the tongue portions remain on only one side of the generally cylindrical strap spring means.

8. A free-wheel device according to claim 1 wherein each convex contact zone has a center of curvature which lies on only one side of the generally cylindrical strap spring means at all inclinations of the cam due to misalignment.

9. A free-wheel device according to claim 1 wherein the tongues are positioned to exert a said force which biases the convex contact zones toward said external cylindrical slideway.

10. A free-wheel device according to claim 1 wherein the tongues are positioned to exert a said force which biases the convex contact zones toward said internal cylindrical slideway.

11. In a free-wheel drive, an external cylindrical slideway and an internal cylindrical slideway mounted substantially concentric one to another for relative rotation and defining therebetween a substantially cylindrical gap;

a series of tiltable clamping cam elements disposed between said slideways within said cylindrical gap, said cam elements being tiltable in one direction into clamping engagement with both of said slideways and tiltable in an opposite direction to tend to disengage said cam elements from said slideways, each cam element comprising an external sliding surface and an internal sliding surface capable of coming into sliding or clamping contact with said respective external and internal cylindrical slideways depending upon the inclination of the corresponding cam element, each cam element further comprising a rearface and a front face, said front face having means defining a convex contact zone;

a strap spring means of generally cylindrical shape mounted between said slideways and having a plurality of windows adapted for mounting therein said cam elements, one edge portion of each said windows engaging said rearface of the cam element mounted in the corresponding window for defining a pivoting edge for said cam element, said strap spring means being formed with a plurality of pivoting tongues respectively extending from a line of articulation into each of said windows for exerting a force against said convex contact zone of said respective cam elements in such a way that the cam elements are caused to pivot into clamping engagement with the slideways and are pushed towards the pivoting edge of the corresponding window;

the position and shape of said convex contact zone being such that a lever arm of said force relative to said pivoting edge varies in inverse proportion to the value of said force when the inclination of the cam element varies due to variations of said cylindrical gap.

12. A free-wheel device according to claim 11 wherein, at different inclinations of a cam due to misalignment during free-wheel operation, there is a substantially constant angle between (a) a line of force exerted by the cam on the tongue, and (b) a straight line which extends from said line of articulation to a point where the tongue contacts the cam.

13. A free-wheel device according to claim 12 wherein the tongue is substantially plane, and said constant angle is about 90°.

14. A free-wheel device according to claim 11 wherein each tongue has a convex surface which contacts its respective cam.

15. A free-wheel device according to claim 11 wherein the convex contact zone is defined by a lateral excrescence of the cam, said cam having a lateral wall with a hollow portion which is partially penetrated by the tongue.

16. A free-wheel device according to claim 11 wherein the convex contact zone has a cylindrical surface portion.

17. A free-wheel device according to claim 11 wherein, at all inclinations of the cams, the tongue portions remain on only one side of the generally cylindrical strap spring means.

18. A free-wheel device according to claim 11 wherein each convex contact zone has a center of curvature which lies on only one side of the generally cylindrical strap spring means, at all inclinations of the cam due to misalignment.

19. A free-wheel device according to claim 11 wherein the tongues are positioned to exert a said force which biases the convex contact zones toward said external cylindrical slideway.

20. A free-wheel device according to claim 11 wherein the tongues are positioned to exert a said force which biases the convex contact zones toward said internal cylindrical slideway.

21. A clamping cam element structure adapted to be mounted between a pair of concentric slideways defining therebetween a cylindrical gap, said cam element being adapted to be tilted in one direction into clamping engagement with both of said slideways and in an opposite direction to tend to be disengaged from said slideways, said cam element comprising an external sliding surface and an internal sliding surface capable of coming into sliding or clamping contact with said respective cylindrical slideways depending upon its inclination, a rearface and a front face, said front face having means defining a convex contact zone;

said convex contact zone being adapted for engaging with a pivoting tongue extending from a line of articulation on a strap spring means of generally cylindrical shape mounted between said slideways and having a plurality of windows adapted for mounting therein a plurality of said cam elements, one edge portion of each said windows engaging said rearface of the cam element mounted in the corresponding window for defining a pivoting edge for said cam element, the position and shape of said convex contact zone being such that the lever arm of a force exerted by said pivoting tongue against said convex contact position relative to said pivoting edge varies in inverse proportion to the value of said force when the inclination of the cam element varies due to variations of said cylindrical gap.

22. A clamping cam element according to claim 21 wherein the shape of the convex contact zone is such that, at different inclinations of a cam due to misalignment during free-wheel operation, there is a substantially constant angle between (a) a line of force exerted by the cam on the tongue, and (b) a straight line which extends from said line of articulation to a point where the tongue contacts the cam.

23. A clamping cam element according to claim 21 wherein the convex contact zone is defined by a lateral excrescence of the cam, said cam having a lateral wall with a hollow portion which is partially penetrated by the tongue.

24. A clamping cam element according to claim 21 wherein the convex contact zone has a cylindrical surface portion.

* * * * *